United States Patent [19]

Stormont

[11] Patent Number: 5,550,315
[45] Date of Patent: Aug. 27, 1996

[54] ANISOTROPIC CAPILLARY BARRIER FOR WASTE SITE SURFACE COVERS

[75] Inventor: John C. Stormont, Sandia Park, N.M.

[73] Assignee: Sandia Corporation, Albuquerque, N.M.

[21] Appl. No.: 409,376

[22] Filed: Mar. 23, 1995

[51] Int. Cl.⁶ .................................................. B04B 1/00
[52] U.S. Cl. ......................... 588/259; 405/128; 405/129
[58] Field of Search .................................. 405/128, 129; 588/259

[56] References Cited

U.S. PATENT DOCUMENTS

| | | | |
|---|---|---|---|
| 5,061,119 | 10/1991 | Balthaus et al. | 405/128 |
| 5,259,697 | 11/1993 | Allen et al. | 405/129 |
| 5,295,763 | 3/1994 | Stenborg et al. | 405/129 |
| 5,372,459 | 12/1994 | Prange et al. | 405/129 |

Primary Examiner—George A. Suchfield
Attorney, Agent, or Firm—George H. Libman

[57] ABSTRACT

Waste sites are capped or covered upon closure. The cover structure incorporates a number of different layers each having a contributory function. One such layer is the barrier layer. Traditionally the barriers have been compacted soil and geosynthetics. These types of barriers have not been successfully implemented in unsaturated ground conditions like those found in dry climates. Capillary barriers have been proposed as barrier layers in dry environments, but the divergence length of these barriers has been found to be inadequate. An alternative to the capillary barrier is a anisotropic capillary barrier. An anisotropic capillary barrier has an increased divergence length which results in more water being diverted laterally preventing the majority of water from percolating in a downward direction through the barrier.

30 Claims, 9 Drawing Sheets

$$\theta = \tan^{-1}\left[\frac{K_x \sin^2\phi + K_z \cos^2\phi}{(K_x - K_z)\cos\phi \sin\phi}\right]$$

ANISOTROPIC CAPILLARY BARRIER FOR WASTE SITE SURFACE COVERS

This invention was made with Government support under Contract No. DE-AC04-94AL85000 awarded by the U.S. Department of Energy. The Government has certain rights in this invention.

BACKGROUND OF THE INVENTION

This invention relates generally to a method for forming a barrier layer to limit percolation through a surface cover over a waste site. More particularly, the invention relates to a method for forming an anisotropic capillary barrier to limit downward movement of water through the surface cover and into a waste site.

Surface covers, hereafter referred to as covers, are required by the Environmental Protection Agency (EPA) as part of an engineered structure for enclosing waste sites, landfills, mine tailing sites, surface impoundments or other environmental hazards. Surface covers perform numerous functions, including: preventing vectors, odors, and blowing litter; allowing loaded vehicles to pass over waste sites; ensuring slope stability; providing a means for controlling slope erosion; limiting percolation of surface water into the waste site; and controlling upward gas movement out of the waste site. The principal purpose of any surface cover is to limit downward movement of water through the waste site and subsequent mobilization of hazardous constituents into the surrounding ground water. The cover can vary from a simple soil structure to a complex multiple layer structure combining earthen materials and geosynthetics. The technology or combination of technologies incorporated into the cover structure are highly dependent on the waste site contents and the associated risks to the surrounding environment.

A typical surface cover structure normally includes at least one layer having a low saturated hydraulic conductivity to limit water movement through the cover system when the layer is completely wet or saturated. This layer is often referred to as a barrier layer and is the principal design feature in most cover designs. In the U.S., this approach is motivated by regulations mandated by the EPA which specify the saturated hydraulic conductivity for the barrier layer. Alternative technologies could be used instead of traditional barrier layers but these alternative technologies must meet EPA specifications. Some of the traditional or conventional barrier layers are described below:

Compacted soil layers (CSLs)—A compacted soil layer is a layer of silty or clay-like soil which is compacted or densified to induce a low saturated hydraulic conductivity. The CSL is a principal feature of the EPA-recommended cover design and has been widely applied to many waste sites throughout the U.S. As experience and information accumulates about CSLs, their shortcomings are becoming more evident. Factors affecting the integrity of CSLs include freeze-thaw effects, shrink-swell effects, erosion, subsidence, root intrusion and animal intrusion. In particular, desiccation, or drying of the soil, is a critical factor affecting the performance of CSLs. Once desiccated, CSLs are likely to crack and become ineffective as a barrier and will allow surface water to penetrate the waste site. Compacted soil layers are unlikely by themselves to be effective long-term barriers.

Geosynthetic clay liners—Geosynthetic clay liners (GCLs) are replacing compacted soil layers for some applications. A GCL is a factory manufactured hydraulic barrier consisting of a thin layer of bentonite clay supported by geotextiles and/or geomembranes. The low saturated hydraulic conductivity of bentonite allows a 5-mm thick layer of betonite used in a GCL to have an effective saturated hydraulic conductivity as low as the saturated hydraulic conductivity of a 1-m thick compacted soil layer. Many of the advantages associated with the use of GCLs as compared to CSLs are found in the GCL installation process: GCLs can be installed fast, with lightweight equipment, less field testing is required and GCLs are installed dry. Although the bentonite layer will desiccate, a low saturated hydraulic conductivity is recovered when the betonite is rewetted. The principal disadvantages of GCLs are cost, the lack of installation experience, the vulnerability of the GCLs to puncture, the long term durability of GCLs, and slope stability.

Geomembranes—Geomembranes are typically constructed of polyethylene and are usually 20 mils thick at a minimum. Although they can be installed relatively quickly, geomembranes often develop flaws during construction such as tears, punctures, and open seams. Current estimates are that more than half of the geomembranes installed have 8 or more flaws per acre. For example, although they can accommodate significant deformations, large amounts of subsidence and the settlement seen in many landfills will cause the geomembrane to fail. Another concern is the potential for the geomembrane to become brittle over time, usually caused by a variety of degradation mechanisms. Geomembranes are being used more frequently in covers as part of a composite structure that includes either a CSL or GCL. A barrier layer employing the composite structure is proving more effective in reducing or limiting downward water movement through the waste site. Enhanced functionality of the barrier layer can only be achieved if there is good contact between the geomembrane and the underlying layer.

Most of the time the cover and the area around the cover is not saturated, yet the conventional barrier layers, as described above, are designed to function under saturated conditions. In other words, these barrier layers are designed to restrict water movement when the layers are completely wet. However, in dry climates like those found in the majority of the western U.S., conventional barriers layers will not work well because of the unsaturated conditions typically found in the soils. Accordingly, simpler, less expensive cover designs more consistent with the natural environment are actively being sought.

Alternative surface cover designs are also motivated by the cost and limitations of the conventional barrier layers or composite barrier layers described above. Another reason for alternative barrier technologies is that most barrier layers degrade over time. Finally, multi-component engineered covers are expensive, and alternative designs could reduce costs.

One such alternative design to a traditional barrier layer design is a capillary barrier. Generally, a capillary barrier consists of a top layer-sublayer structure. Typically, the top layer and the sublayer are both soil layers, but the top layer is a finer granular sand-like material and the sublayer is a coarser material, typically a gravel-like material. The contrasting properties of the materials in the top layer-sublayer arrangement serve as a barrier to downward water flow. Water is preferentially held in the top layer by capillary forces as a consequence of its fine structure until the water is removed by evaporation or plant transpiration or, if the top layer-sublayer interface is sloped, water in the top layer will also drain laterally, parallel to the interface, by unsaturated flow. The measure of capillary forces within a soil is the matric potential, or pressure potential, or soil suction. The effectiveness of a capillary barrier is defined by its divergence length.

Divergence length is the distance which water is laterally diverted along the top layer-sublayer interface before any of the water moves into the sublayer. The top layer has to remain relatively dry or the capillary forces will decrease the extent to which water will drain quickly through the top layer into the sublayer. A capillary barrier is effective if the combined effect of evaporation, transpiration, and lateral divergence exceeds the infiltration from precipitation, thereby keeping the system sufficiently dry so that appreciable movement of water from the top layer into the sublayer, termed breakthrough, does not occur. Consequently, capillary barriers are thought to be most applicable to relatively arid sites such as a large portion of the western U.S.

Field studies indicate that under the most stressful conditions (high precipitation, low evapotranspiration), the divergence length of a capillary barrier having a sloped interface from 1 to 10%, is less than 10 m. A cover incorporating a capillary barrier having a divergence length of 10 m would not be sufficient to divert downward flowing water across most waste sites. Because of the relatively short characteristic divergence length of a capillary barrier, movement of water into a waste site is a real threat.

The subject invention as described herein, anisotropic capillary barriers, have greater divergence lengths than conventional capillary barriers. The increased divergence length of an anisotropic capillary barrier will make its acceptance and use applicable to more waste sites under a wider range of conditions.

Anisotropic capillary barriers have a similar structure to capillary barriers, a top layer-sublayer structure. The primary difference between an anisotropic capillary barrier and a conventional (isotropic) capillary barrier is the anisotropic unsaturated hydraulic conductivity of the top layer in the anisotropic capillary barrier. Anisotropic unsaturated hydraulic conductivity is defined by the condition that the lateral unsaturated hydraulic conductivity does not equal that of the normal unsaturated hydraulic conductivity in a given layer. The lateral direction is the direction parallel to the top layer-sublayer interface, and the normal direction is the direction perpendicular to the top layer - sublayer interface. In conventional capillary barriers the top layer has the same unsaturated hydraulic conductivity in both the lateral and normal directions. More specifically, the top layer of the anisotropic capillary barrier has a greater unsaturated hydraulic conductivity in the lateral direction than the normal direction. The lateral direction is the direction parallel to the top layer-sublayer interface, and the normal direction is the direction perpendicular to the top layer - sublayer interface. The increased divergence length found in an anisotropic capillary barrier can be attributed to the anisotropic hydraulic conductivity.

Anisotropic hydraulic conductivity can be engineered into a barrier by compaction techniques, layering and/or amending the top layer to create a composite top layer structure. The amount of anisotropy can be defined as the ratio of hydraulic conductivities in the lateral direction to the normal direction, and anisotropy can range from a factor of one (no anisotropy) to many orders of magnitude. The increased divergence length seen in anisotropic capillary barriers is approximately proportional to the ratio of the principal hydraulic conductivities for many assumed infiltration rates and material properties. The amount of anisotropy required depends on the risks associated with the specific waste site and local conditions, and can be designed for a particular situation.

SUMMARY OF THE INVENTION

It is an object of this invention to form a waste site cover using an anisotropic capillary barrier.

It is another object of this invention to provide a method for forming an anisotropic capillary barrier as part of a waste site cover.

It is another object of this invention to provide a method for forming a anisotropic capillary barrier having a top layer with anisotropic unsaturated hydraulic conductivity overlying a sublayer.

It is another object of this invention to provide a method for forming an anisotropic capillary barrier having a composite top layer structure which imparts an overall, effective unsaturated hydraulic conductivity anisotropy to the top layer overlying a sublayer.

Another object of this invention is to provide a method for forming an anisotropic capillary barrier having a top layer with greater unsaturated hydraulic conductivity in the lateral direction than the unsaturated hydraulic conductivity in the normal direction.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a method for forming a waste site cover including a anisotropic capillary barrier, wherein the anisotropic capillary barrier has a higher unsaturated hydraulic conductivity in the lateral direction than in the normal direction.

BRIEF DESCRIPTION OF THE DRAWINGS

The accompanying drawings, which are incorporated in and form part of the specification, illustrate an embodiment of the present invention, and together with the description, serve to explain the principles of the invention.

DETAILED DESCRIPTION OF THE INVENTION

Figure 1:
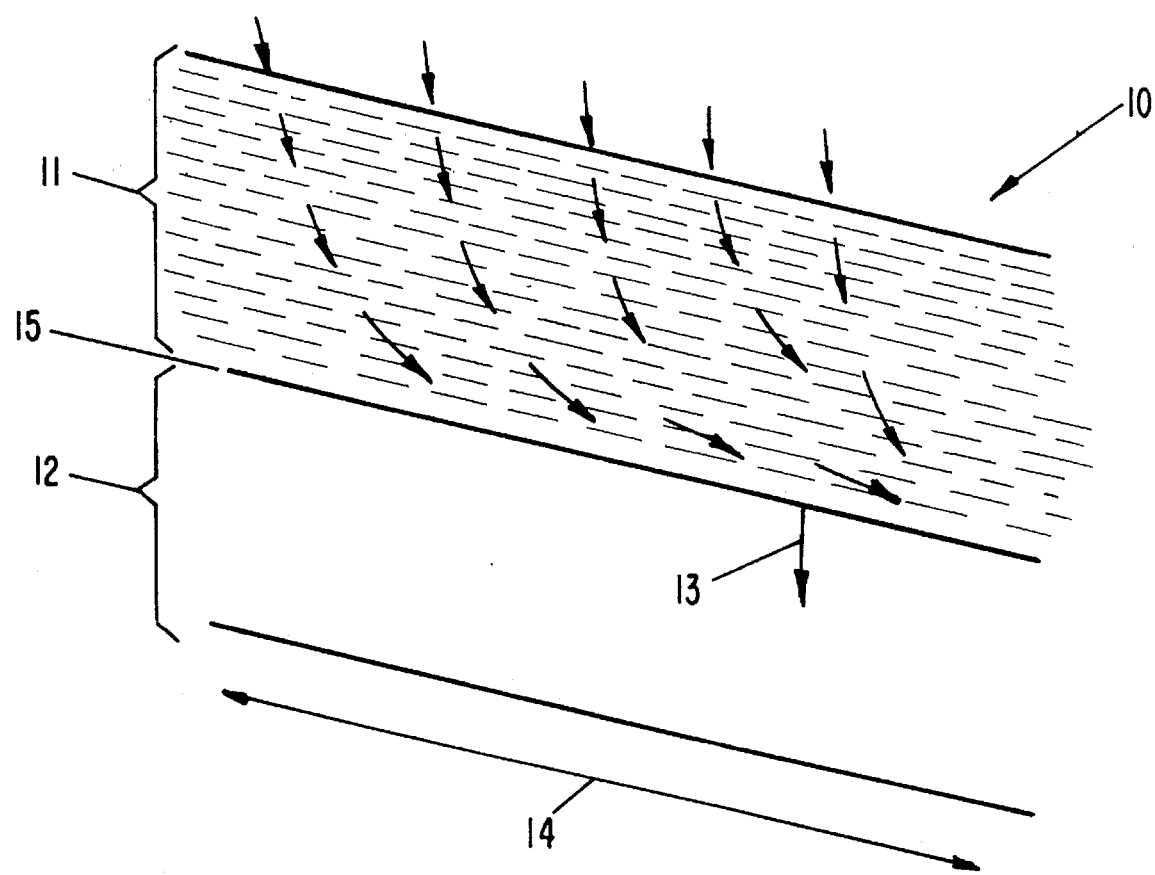
FIG. 1—shows a general schematic of a capillary barrier.

A conventional capillary barrier 10 is illustrated in FIG. 1 as having a top layer 11 over a sublayer 12 forming an interface 15. Capillary barriers are now being considered by the Industry and EPA as an alternative to traditional barrier layers in relatively arid regions. Capillary barriers function because of the contrast in unsaturated hydraulic conductivity of the top layer 11 as compared to the sublayer 12 at similar matric potentials which exist near the top layer-sublayer interface 15. In a typical or conventional capillary barrier the unsaturated hydraulic conductivity in the direction parallel to the interface and perpendicular to the interface is substantially equal. Failure of the capillary barrier occurs when water from the top layer 11 moves into the sublayer 12, as illustrated at breakthrough 13. The distance along the interface that the capillary barrier excludes water from the sublayer 12 is termed the divergence length 14.

Figure 2:
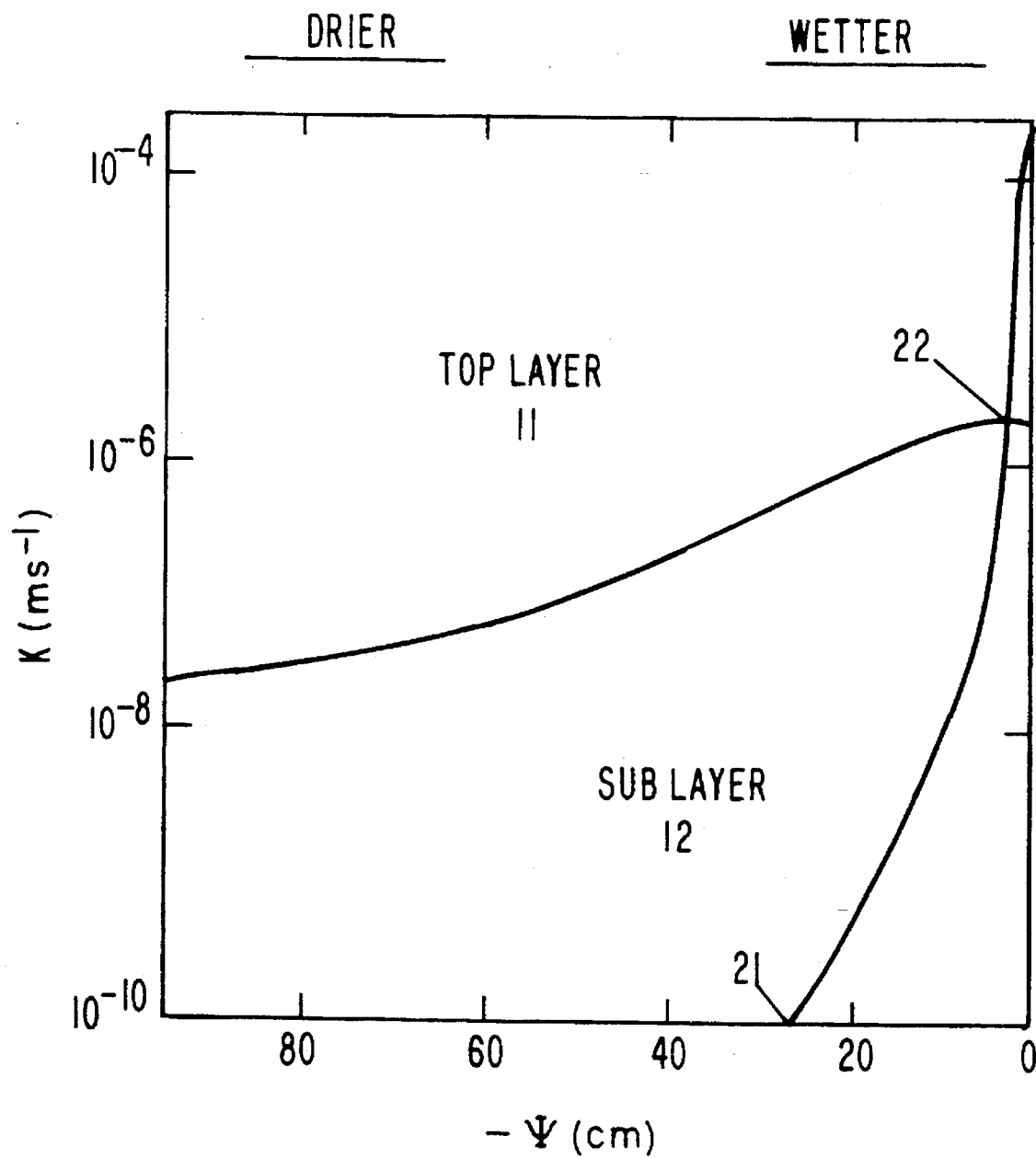
FIG. 2 shows the unsaturated hydraulic conductivity vs. pressure potential for a capillary barrier system.

The functional performance of a capillary barrier can be explained by considering FIG. 2. Beginning at relatively dry conditions, that is, at high negative matric potentials, the top layer 11 has a finite unsaturated hydraulic conductivity, whereas the unsaturated hydraulic conductivity of the sublayer 12 will be immeasurably small. As the moisture content increases the matric potential will increase (become less negative) and the unsaturated hydraulic conductivity of the top layer 11 will increase gradually. The unsaturated hydraulic conductivity of the sublayer 12 will remain immeasurably small until its water entry potential 21 is exceeded. Under the conditions where the water entry potential is not exceeded for the sublayer, water will not move from the top layer 11 into the sublayer 12, but instead will be diverted laterally, that is, parallel to the top layer-sublayer interface, when the interface is sloped. Water movement, or breakthrough, from the top layer 11 into the sublayer 12 occurs when the matric potential at the interface equals the water entry pressure 22 of the sublayer. When the matric potential is increased beyond this water entry pressure 22, the unsaturated hydraulic conductivity of the sublayer will increase rapidly, to such a point where the unsaturated hydraulic conductivity of the sublayer exceeds that of the top layer. Under these conditions, the top layer-sublayer arrangement is no longer a functional barrier to downward water movement.

The following definitions apply to both capillary barriers and the subsequent invention of an anisotropic capillary barrier:

Top layer: The top layer is the upper layer of either a capillary barrier or anisotropic capillary barrier. The top layer is typically soil, and can be described as sand, fine sand, silt, loam, or clay or any other material with similar characteristics. A homogeneous fine layer can be either isotropic as is the case for a conventional barrier, or anisotropic if so constructed. Additionally, the top layer can be a single layer or a composite of multiple layers and materials enabling the top layer to have an effective anisotropic unsaturated hydraulic conductivity.

Transport layer: The transport layer or layers is a subpart of the top layer of some anisotropic capillary barrier designs. The function of a transport layer is to laterally divert water under unsaturated conditions. The transport layer or layers impart an effective anisotropy to the top layer in total. The transport layer must have a greater unsaturated hydraulic conductivity than the remainder of the top layer over the range of matric potentials typically from 0 to −100 cms or lower. The transport layer or layers can be comprised of soil, sand, geosynthetic materials or any material having similar characteristics. Additionally, transport layers can be formed by modifying a portion of the top layer. For example, removing the finest 10 to 20% of the granular material for most soils will dramatically increase the unsaturated hydraulic conductivity of the transport layer. Additionally, the transport layer can be a completely separate layer, such as a very fine-grained and uniform sand interposed in the top layer forming a composite structure.

The transport layer is not a conventional drainage layer. A drainage layer is designed to be effective during saturated conditions. In contrast, a transport layer which has been incorporated into an anisotropic capillary barrier, as part of the top layer structure, is explicitly designed to drain under unsaturated conditions.

Top-sublayer interface: The interface between the top layer and the sublayer can simply be formed by the top layer being in direct contact with the sublayer or an interface layer like a geosynthetic material. Alternatively, a soil or sand filter can be inserted between the top layer and the sublayer. The interface must have a grade, typically in the range of about 1 to 20 percent or be sloped in the range of about 1 to 10 degrees, from horizontal, but can be as great as the angle of repose of the material. The angle of repose can be defined as the angle a material makes with the horizontal plane when the given material is loosely poured into a pile.

Sublayer: The sublayer is also referred to as an underlying layer or a coarse layer. The sublayer is defined by its unsaturated hydraulic conductivity with respect to that of the top layer. The unsaturated hydraulic conductivity of the sublayer should be lower than that of the top layer and transport layers or composite top layer structure for most matric potentials. Although the sublayer hydraulic conductivity is actually greater than that of the top layer at zero matric potential, the unsaturated hydraulic conductivity of the sublayer becomes less than that of top layer (including any transport layers) at the water entry pressure 22 in FIG. 2 and for all smaller (more negative) values of matric or pressure potential. Capillary barriers and anisotropic capillary barriers are effective as barriers only from the water entry pressure point 22 lower (more negative) matric potentials. Capillary barriers and anisotropic capillary barriers are effective below the water entry pressure point because the unsaturated hydraulic conductivity of the sublayer is now less than that of the top layer, so the sublayer conducts or accepts less water than the top layer can provide. The sublayer can be comprised of sand, gravel, geotextiles, geonets or other materials which have similar characteristics. The sublayer can be very thin (5 mm or less) and still perform its function in a capillary barrier or anisotropic capillary barrier. The sublayer can also be many meters thick depending on other functions the sublayer might perform such as a barrier to burrowing animals or for waste-generated gas collection. This layer lies above the contents of the waste site, either directly on top or on top of other materials overlying the waste.

Figure 3:
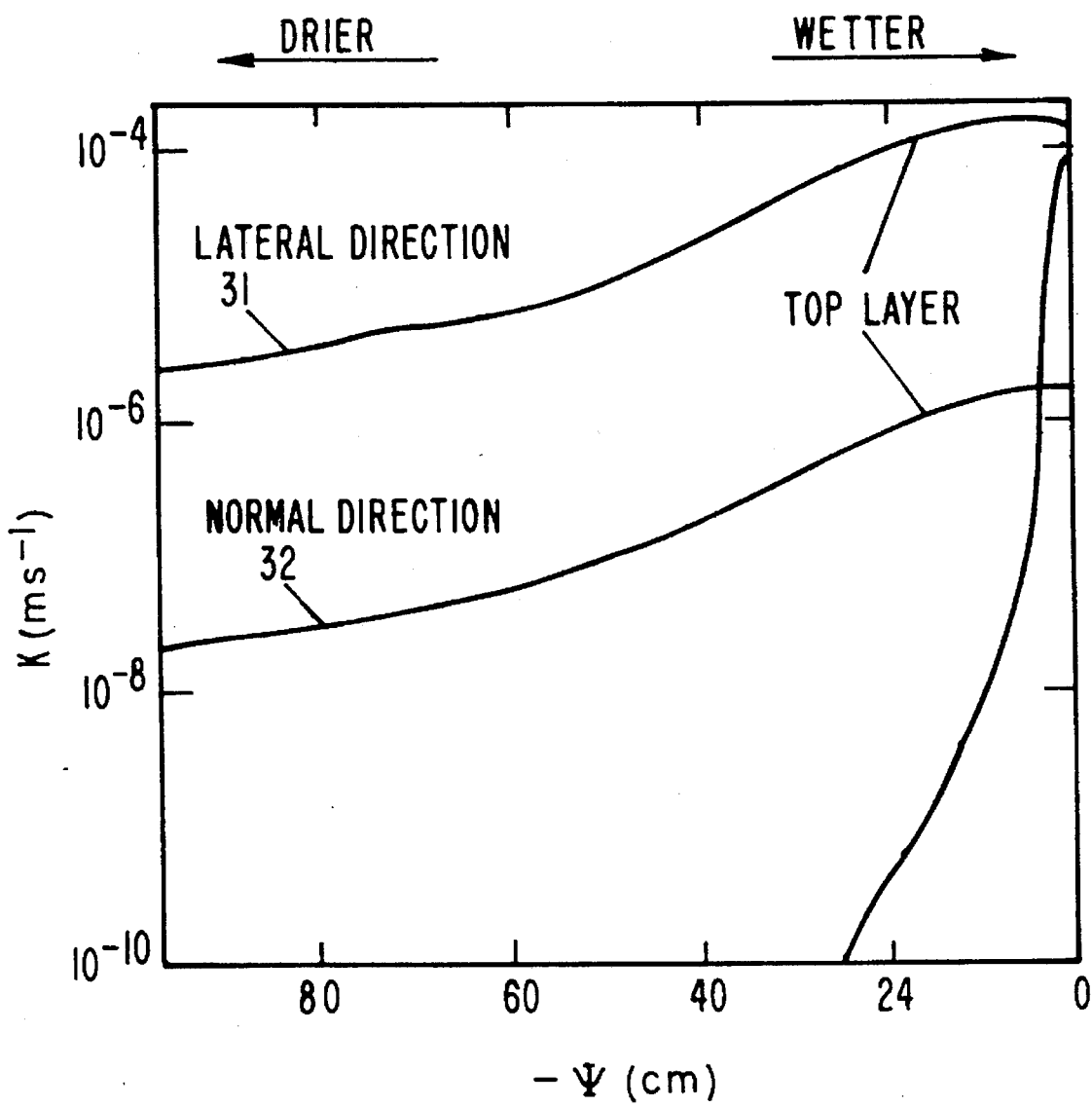
FIG. 3 shows unsaturated hydraulic conductivity vs. pressure potential for an anisotropic capillary barrier system.

Anisotropic capillary barriers are preferable to prior art capillary barriers because of greater divergence lengths and greater unsaturated hydraulic conductivity in the lateral direction (parallel to the top layer-sublayer interface) compared to the normal direction (perpendicular to the top layer-sublayer interface). The unsaturated hydraulic conductivity properties of an anisotropic capillary barrier are shown in FIG. 3 to illustrate constant anisotropy for an anisotropic capillary barrier, that is, the ratio of the unsaturated hydraulic conductivity in the lateral direction 31 to the normal direction 32 is constant at all matric potentials. There are cases where the unsaturated hydraulic conductivity ratio is not constant. In these cases, as long as the lateral unsaturated hydraulic conductivity exceeds the normal unsaturated hydraulic conductivity for expected matric potentials, typically from near 0 to −100 cm or lower, anisotropic capillary barriers continue to function as a barrier to downward water movement. The properties of the sublayer for an anisotropic capillary barrier are the same as for a conventional capillary barrier.

Figure 4:
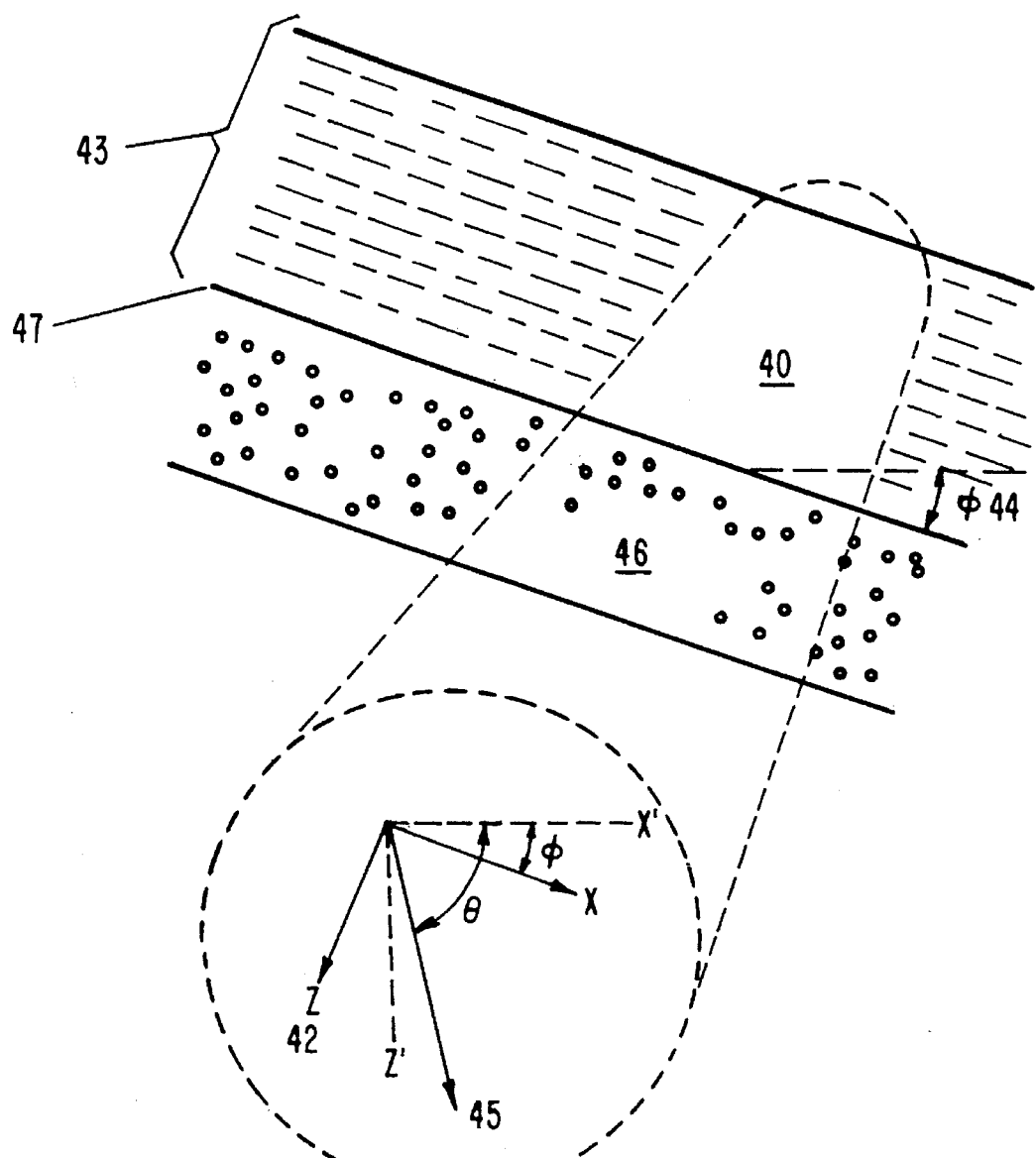
FIG. 4 is a schematic of an anisotropic capillary barrier.

The longer divergence length of the anisotropic capillary barrier can be quantified for the specific case of constant anisotropy and constant infiltration at the top surface of the anisotropic capillary barrier. This is the only condition for which an exact solution exist. The assumed problem geometry is shown in FIG. 4. The lateral direction is denoted as the x-direction 41, and the normal direction is denoted as the z-direction 42. A top layer 40 of thickness b 43 overlies a sublayer 46 with the contact sloped at angle φ 44. A constant infiltration rate q (45) is applied to the surface of the top layer. As a consequence of the anisotropy of the top layer, the infiltration of water to the top layer is deflected toward the lateral direction 41. Downward moving water is diverted laterally as it approaches the top layer-sublayer interface 47. Lateral diversion in the top layer 40 results in an increasing water content in the lateral 41 or downdip direction of the top layer 40. Eventually, there will be a location near the top layer-sublayer interface 47 which will become saturated so that an amount of water equal to the infiltration rate moves into the sublayer 46. The movement of water into the sublayer layer is breakthrough. The lateral distance which the capillary barrier excludes water from the sublayer is the divergence length.

The hydraulic conductivity of the two-dimensional system under consideration is described by a second-order symmetric tensor $K_{ij}$. Employing the quasi-linear approximation, the hydraulic conductivity of the top layer is given by $$K_{ij} = K_{ij}^s \, e^{\alpha\phi} \qquad (1)$$

where $K_{ij}^s$ the saturated hydraulic conductivity, $\alpha$ is the sorptive number and $\phi$ is the matric potential. The principal directions of the hydraulic conductivity tensor for the top layer are assumed to be coincident with the interface or contact angle, i.e., the lateral and normal directions are the principal directions. This is reasonable in that anisotropy introduced by an emplacement or compaction technique during the construction of the top layer will most likely follow the interface slope. To simplify the following analysis, the sorptive number is assumed to be constant and not a function of the moisture state or direction. Because anisotropy ratios most often increase above the saturated value as a soil dries, accounting for moisture-state dependence may increase the effect of anisotropy. The hydraulic conductivity of the sublayer layer is assumed to be isotropic. An asterisk denotes coarse layer properties, i.e., the relative permeability is $k^{r*} = e^{\alpha^*\phi}$. It is also necessary to assume that the thickness of the top layer is finite but relatively thick, where b is few times greater than $((\alpha \cos\phi)^{-1})$ so that the upper boundary is not appreciably affected by the top layer-sublayer interface.

Assuming all water which infiltrates is diverted in the lateral direction, parallel to the top layer-sublayer interface, the maximum divergence length L is given by $$L \leq \frac{K_{xx}^s \tan\phi}{qa} \left[ \left(\frac{q}{K^{s*}}\right)^{\frac{a}{a^*}} - \frac{q\cos\xi}{K_{zz}^s \cos\phi} \right] e^{a\cos\xi} + \frac{q\cos\xi}{K_{zz}^s \cos\phi} \qquad (2)$$

Equation (2) can be used to illustrate the effect of the top layer anisotropic unsaturated hydraulic conductivity has on the performance of a capillary barrier for a typical surface cover application.

As an example, a 1-m thick top layer overlies a sublayer with the interface sloped at 5°. The top layer properties ($K_z^s = 10^{-4}$ cm/sec, $\alpha = 0.02$ cm$^{-1}$) are typical for near-surface. The top layer is a silty sand for this example. The properties of the sublayer ($K^{s*} = 1$ cm/sec, $\alpha = 5$ cm$^{-1}$) correspond to a gravel. Anisotropic conditions are produced by holding the hydraulic conductivity in the direction normal to the top layer-sublayer interface constant (the z-direction) and varying the hydraulic conductivity in the lateral direction (x-direction). The value of $\alpha$ is assumed to remain constant. The infiltration rate is varied from 0.1 $K_z^s$ to 0.01 $K_z^s$. Results for the solution of equation (2) are given in FIG. 5

Figure 5:
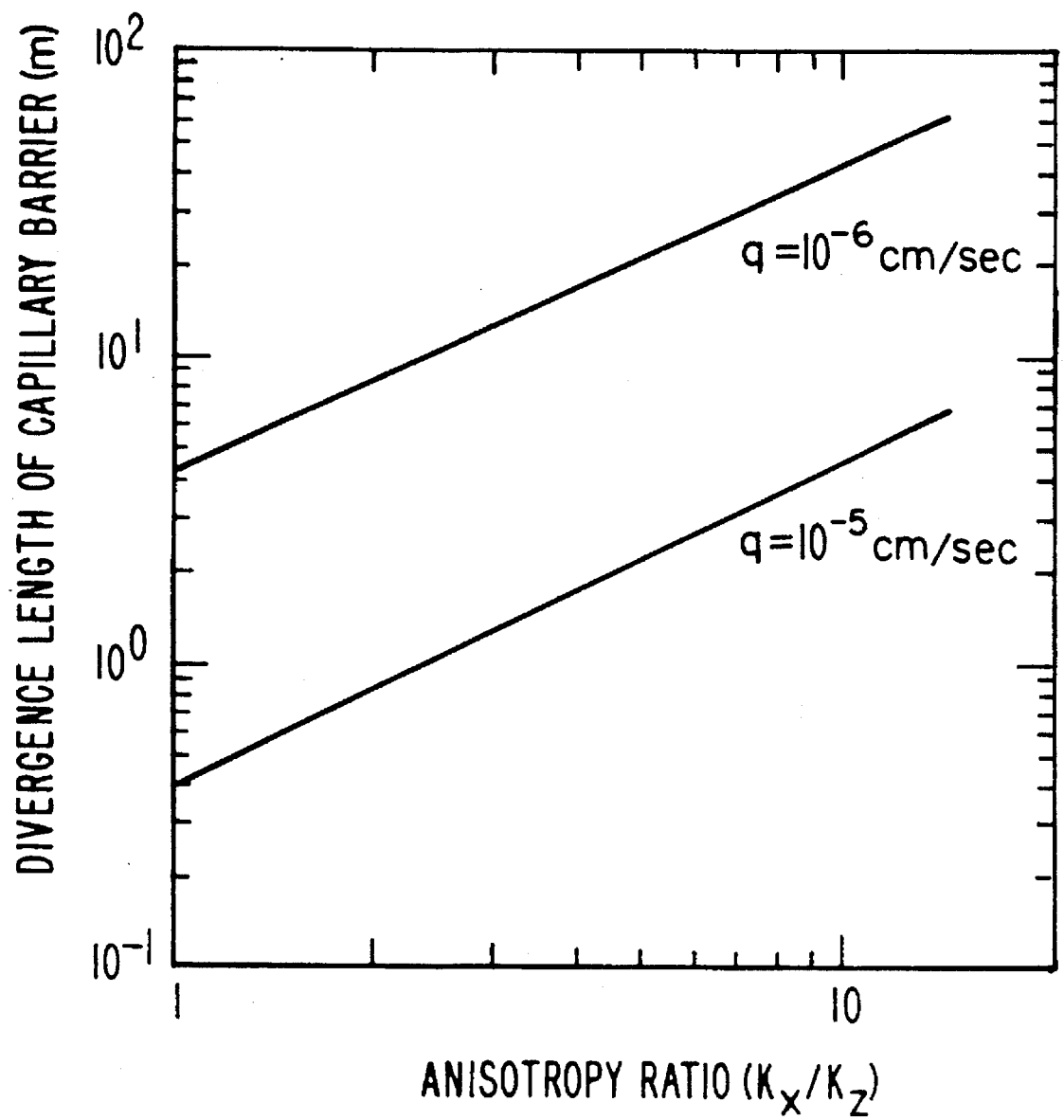
FIG. 5 shows divergence length as a function of anisotropic hydraulic conductivities for anisotropic capillary barriers.

From the results show in FIG. 5, the maximum length of the capillary barrier increases nearly linearly with the anisotropy ratio. The anisotropy ratio is the ratio of lateral unsaturated hydraulic conductivity to normal unsaturated hydraulic conductivity of the top layer. Thus, an anisotropy ratio of 10 yields a divergence length approximately ten times greater than for a conventional isotropic barrier with similar properties The specific design of an anisotropic capillary barrier depends upon the required divergence length for a particular waste site. For example, consider a location where the required divergence length is 50 m and the divergence length of a conventional barrier using local, native soils is 10 m. From Equation (2), this suggests an anisotropy ratio of 5 is necessary for the anisotropic capillary barrier to perform as necessary.

Anisotropic capillary barriers can be constructed using a variety of different techniques.

Figure 6A:
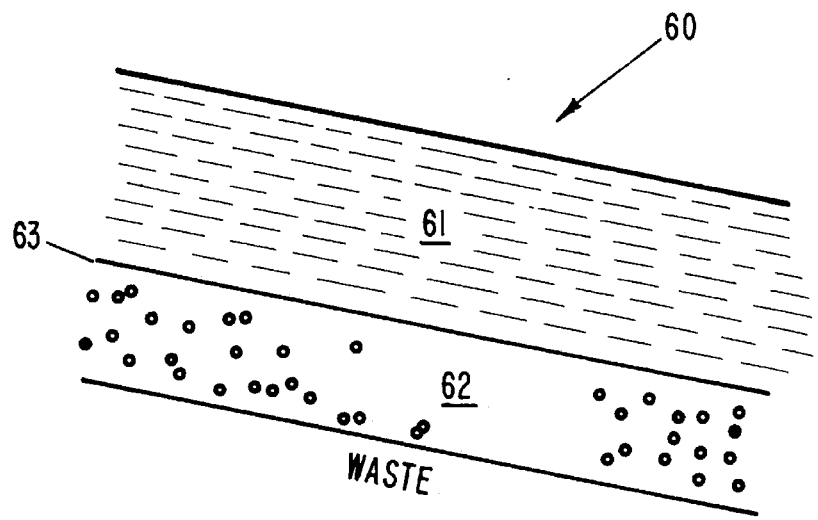
FIG. 6a. shows a general anisotropic capillary barrier structure.

One embodiment of an anisotropic capillary barrier 60 is shown in FIG. 6a. The anisotropic capillary barrier is very similar to the conventional capillary barrier in that its structure is a top layer 61 over a sublayer 62 forming a top layer-sublayer interface 63. The anisotropy of the top layer is formed by compacting the top layer 61 in such away that the lateral unsaturated hydraulic conductivity is greater than the normal direction unsaturated hydraulic conductivity. For granular soils, static compaction will induce more anisotropy than dynamic compaction. Thus, compacting the soil layer 61 with a roller type device, preferably a smooth roller type device, is a better technique for inducing anisotropy compared to compaction techniques which rely at least impart on vibration. Other compaction techniques known to one of ordinary skill in the art can be used to induce anisotropy in the soil layer.

Figure 6B:
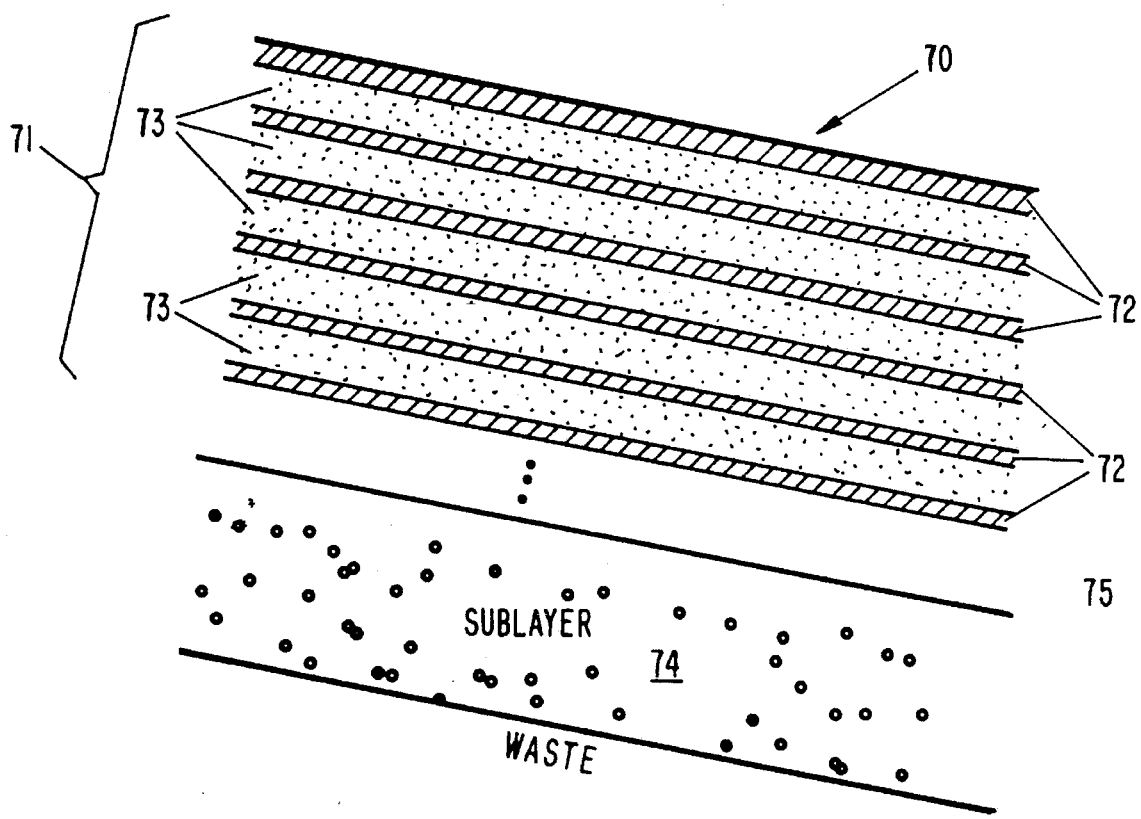
FIG. 6b. shows an anisotropic capillary barrier structure having a composite top layer structure.

Another embodiment of the anisotropic capillary barrier 70 is shown in FIG. 6b. In this embodiment the anisotropy of the top layer 71 is created by alternating transport layers 72 with soil layers 73 forming a composite top layer 71. A sublayer 74 underlies the top layer. The number, thickness, and location of alternating transport layers is determined by the anisotropic hydraulic conductivity required by the system.

Another embodiment of the anisotropic capillary barrier shown in FIG. 6b is to adjust the compaction process so the compaction creates a top layer 71 with alternating earthen layers of more dense and less dense materials. The less dense layers will have a greater unsaturated hydraulic conductivity than the more dense layers. The less dense layers essentially form transport layers 72. This structure could be created by using less compactive energy than normal but with normal lift thickness, or by using normal compactive energies but with thicker lifts than normal, or some combination of these techniques.

Figure 6C:
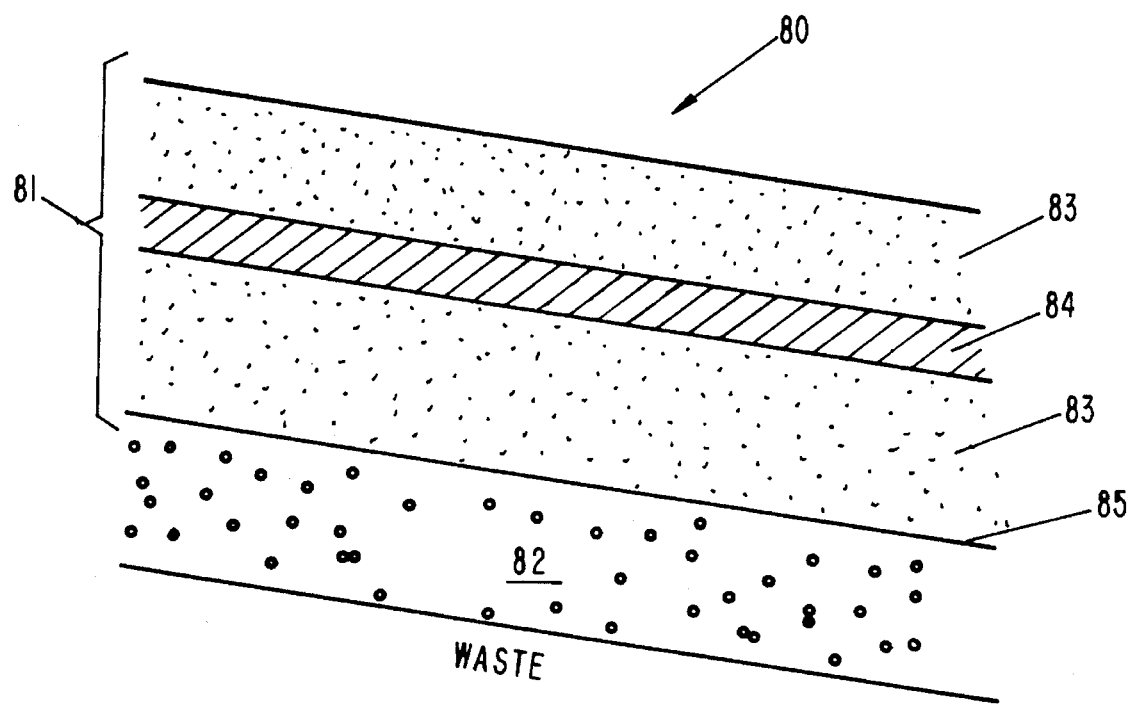
FIG. 6c. shows a anisotropic capillary barrier having an alternative top layer structure.

Another alternative structure for an anisotropic capillary barrier 80 is shown in FIG. 6c. In this example the anisotropic capillary barrier structure consists of a top layer 81 overlying a sublayer 82 having an interface 85. The top layer has a single transport layer 84, with the remainder of the top layer 81 being a soil like material 83 again forming a composite top layer 81. The transport layer is most effective if it is located near the top layer -sublayer interface 85, but can be located anywhere within the top layer 81. In the examples describe above the sublayer can be any material or thickness that meets the unsaturated hydraulic conductivity criteria as described.

Figure 7A:
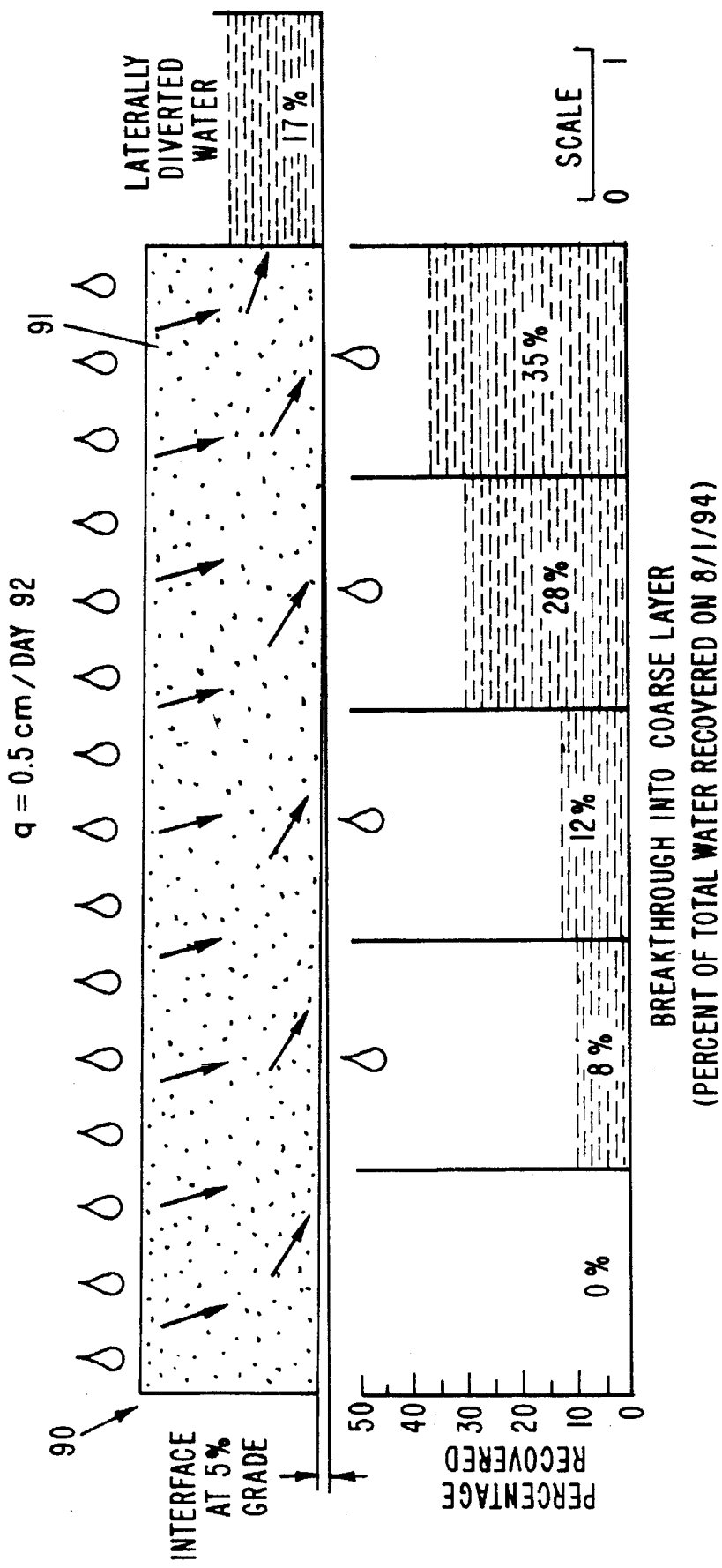
FIG. 7a shows schematically the field tested configuration for a conventional capillary barrier.
Figure 7B:
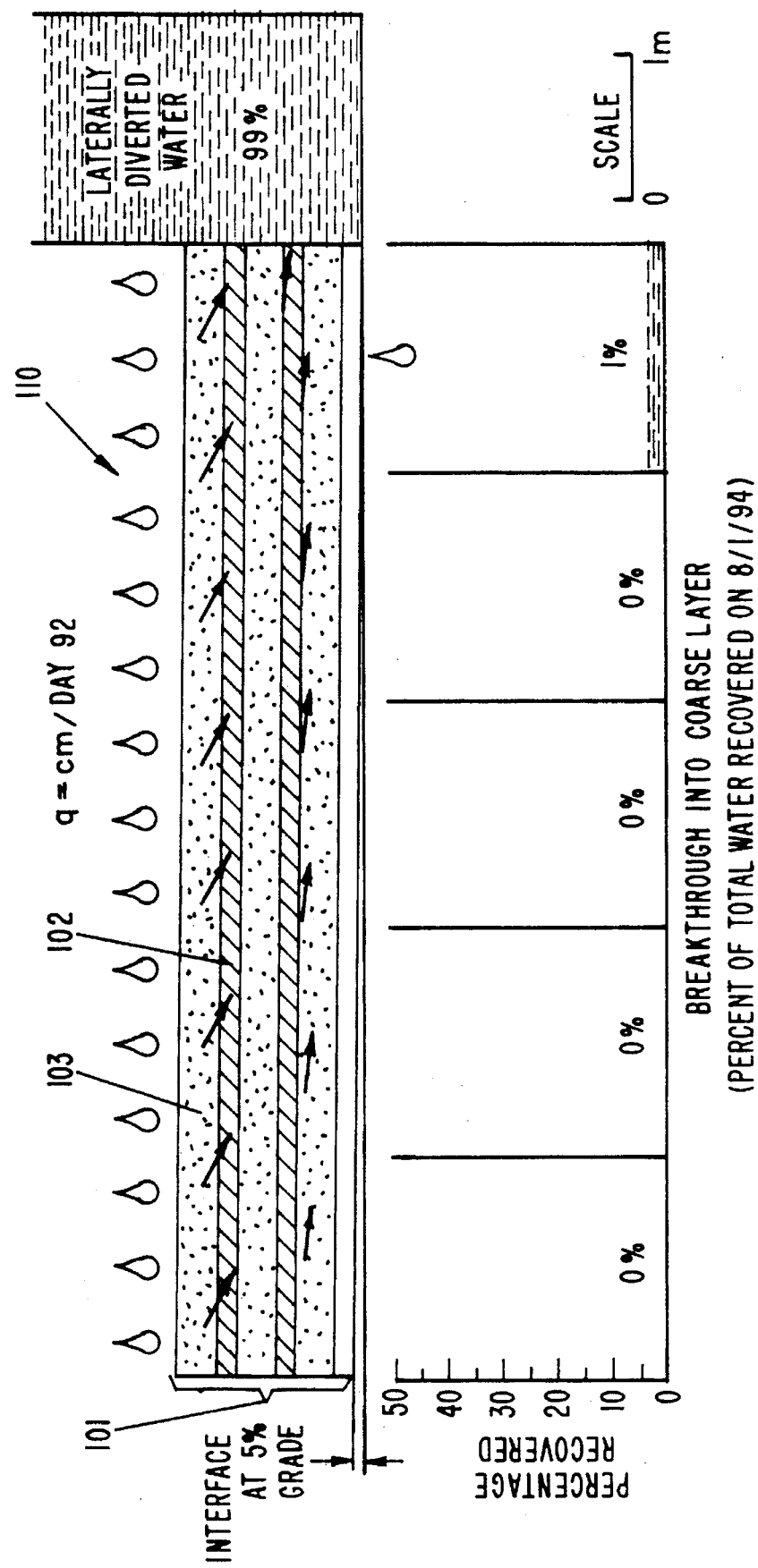
FIG. 7b shows schematically the field tested configuration for an anisotropic capillary barrier.

The performance of a conventional isotropic capillary barrier and an anisotropic capillary barrier were compared in a field test. FIGS. 7a and 7b are representative of the field test configurations revealing the top layer but not the underlying sublayer. Water balance measurements were made in above-ground "boxes" consisting of a 90 cm thick top layer overlying a 30 cm sublayer for both configurations. The boxes were 6-m long and on about a 5% grade and were covered to limit evaporation and transpiration. Water was added to the top surface of the profile to simulate rainfall, and measurements were made of the water storage within the profile, lateral divergence in the top layer and breakthrough in the sublayer. FIG. 7a represents the conventional isotropic capillary barrier 90. The capillary barrier 90 had a homogenous top layer 91 comprised of a local silty sand. FIG. 7b represents the other box housing an anisotropic capillary barrier 110 having a top layer 101 which was formed by alternating fine sand layers (transport layers), about a 10-cm thick, 102 and soil layers, about 20-cm thick of local silty sand 103. The sublayer in both configurations was rounded stone. Water was added to both boxes for 60 consecutive days at an infiltration rate 92 of about 0.5 cm/day. The anisotropic capillary barrier was so efficient in laterally diverting water that less than 1% of the added water broke through the top layer into the coarse layer. The conventional isotropic capillary barrier permitted more than 75% of the added water to breakthrough.

The anisotropic capillary barrier structure and method for forming therein discussed above are cited merely to illustrate particular embodiments of this invention. It is contemplated that the use of this invention may involve a variety of structures having different sizes, shapes, and materials as long as the principles of the system disclosed herein are followed. For example, although the invention has been disclosed using a earthen materials like sand, soil, and gravel, other synthetic material having similar characteristics could be used in the anisotropic capillary barrier structure. Likewise any compaction technologies known to one of ordinary skill in the art that would impart anisotropic hydraulic conductivity preferentially in the lateral direction versus the downward direction can be used in the formation of the barrier. It is intended that the scope of the invention be defined by the claims appended below.

What is claimed is:

1. A barrier layer for a waste site cover, comprising:
a sublayer having an unsaturated hydraulic conductivity and a top surface and a bottom surface, wherein the bottom surface is in close proximity to said waste site;
a top layer in contact with said top surface of said sublayer wherein said top layer and said sublayer form a top layer-sublayer interface; and said top layer has an effective anisotropic unsaturated hydraulic conductivity.

2. A barrier layer as claimed in claim 1, wherein the effective anisotropic unsaturated hydraulic conductivity further comprises a lateral and a normal unsaturated hydraulic conductivity, wherein said lateral unsaturated hydraulic conductivity is greater than the normal unsaturated hydraulic conductivity for said top layer.

3. A barrier layer as claimed in claim 2, wherein the sublayer is a material having a lower unsaturated hydraulic conductivity for matric potentials less than zero than the lateral and normal unsaturated hydraulic conductivity of said top layer.

4. A barrier layer as claimed in claim 3, wherein the sublayer material is selected from the group consisting of sand, gravel, geotextiles and geonets.

5. A barrier layer as claimed in claim 1, wherein said top layer-sublayer interface has an interface angle in the range of about 1 to 20 degrees from horizontal.

6. A barrier layer claimed in claim 5, wherein the barrier layer is an anisotropic layer.

7. A barrier layer as claimed in claim 5, wherein the interface further comprises an interface layer interposed between the sublayer and the top layer.

8. A barrier layer as claimed in claim 7, wherein the interface layer is selected from the group consisting of geosynthetic material, soil filter and sand filter.

9. A barrier layer as claimed in claim 1, wherein the top layer is soil having constituents of fine sand, silt, loam, and clay.

10. A barrier layer as claimed in claim 9, wherein top layer is statically compacted so as to impart an anisotropic unsaturated hydraulic conductivity to the top layer.

11. A barrier layer as claimed in claim 1, wherein the top layer further comprises a composite structure of a transport layer and a soil layer and said transport layer has a greater unsaturated hydraulic conductivity than the soil layer for matric potential less than zero and the composite structure has an effective anisotropic unsaturated hydraulic conductivity.

12. A barrier layer as claimed in claim 11, wherein said composite structure of said top layer is a plurality of transport layers alternated with a plurality of soil layers.

13. An anisotropic capillary barrier comprising:
a sublayer having an unsaturated hydraulic conductivity and a top surface; and
a top layer in contact with the top surface of said sublayer forming a top layer-sub layer interface having a grade, said top layer further comprises a composite structure of alternating a plurality of soil layers with a plurality of transport layers, wherein said top layer has an anisotropic unsaturated hydraulic conductivity and said unsaturated hydraulic conductivity of said sublayer is lower that that the anisotropic unsaturated hydraulic conductivity of said top layer.

14. An anisotropic capillary barrier as claimed in claim 13, wherein said sublayer is about 30 cms thick and is a gravel-like material.

15. An anisotropic capillary barrier as claimed in claim 13, wherein said transport layer is about 10 cms thick is a fine sand and said soil layer is 20 cms thick and is a silty sand.

16. An anisotropic capillary barrier as claimed in claim 13, wherein said interface grade is about 5 percent.

17. A method for forming an anisotropic capillary barrier for covering a waste site, comprising the steps of:

a) depositing a sublayer of a material having an unsaturated hydraulic conductivity and a top and a bottom surface, wherein the bottom surface is closest to the waste site; and b) depositing a top layer of material on the top surface of the sublayer, wherein said top layer has an effective anisotropic unsaturated hydraulic conductivity and said top layer and sublayer form a top layer - sublayer interface.

18. A method as claimed in claim 17, wherein the unsaturated hydraulic conductivity of the sublayer is less than the effective anisotropic unsaturated hydraulic conductivity of said top layer.

19. A method as claimed in claim 18, wherein the sublayer is selected from the group consisting of sand, gravel, geotextiles and geonets.

20. A method as claimed in claim 17, wherein said top layer is soil.

21. A method as claimed in claim 20, wherein said top layer is selected from the group consisting of fine sand, silt, loam, and clay.

22. A method as claimed in claim 17, wherein the method further comprises compacting the top layer and said compacted top layer has a lateral and a normal unsaturated hydraulic conductivity and said lateral unsaturated hydraulic conductivity is greater than said normal unsaturated hydraulic conductivity, said compacted top layer effectively having an anisotropic unsaturated hydraulic conductivity.

23. A method as claimed in claim 22, wherein top layer is statically compacted.

24. A method as claimed in claim 17, wherein said top layer-sublayer interface has an interface angle and said interface angle is in the range of about 1 to 20 degrees from horizontal.

25. A method as claimed in claim 24, wherein the interface angle is less than or equal to the angle of repose of the top layer.

26. A method as claimed in claim 17, wherein the method further comprises interposing an interface layer between the top layer and the sub layer.

27. A method as claimed in claim 26, wherein the interface layer is selected from the group consisting of geosynthetic material, soil filter and sand filter.

28. A method as claimed in claim 17, wherein said top layer is a composite top layer further comprising a transport layer and a soil layer and the transport layer has a greater unsaturated hydraulic conductivity then the soil layer for matric potentials less than zero and said composite layer has an effective anisotropic unsaturated hydraulic conductivity.

29. A method as claimed in claim 28, wherein said composite top layer further comprises a plurality of transport layers alternating with a plurality of said soil layers.

30. A method as claimed in claim 28, wherein the transport layer is selected from the group consisting of soil, sand, and geosynthetic material.

* * * * *